US006990000B1

(12) United States Patent
Rodriguez et al.

(10) Patent No.: US 6,990,000 B1
(45) Date of Patent: Jan. 24, 2006

(54) RECONSTRUCTION OF THE OUTPUT VOLTAGE OF AN AC-DC POWER CONVERTER

(75) Inventors: Harry Rodriguez, Gilroy, CA (US); Anatoly Shteynberg, San Jose, CA (US); Mark D. Telefus, Orinda, CA (US); Mark D. Eason, Hollister, CA (US)

(73) Assignee: iWatt Inc., Los Gatos, CA (US)

( * ) Notice: Subject to any disclaimer, the term of this patent is extended or adjusted under 35 U.S.C. 154(b) by 0 days.

(21) Appl. No.: 10/944,014

(22) Filed: Sep. 17, 2004

(51) Int. Cl.
*H02M 7/529* (2006.01)

(52) U.S. Cl. ...................................................... 363/97
(58) Field of Classification Search ................ 363/21.1, 363/21.05, 21.11, 21.13, 21.18, 89, 97, 131; 323/283
See application file for complete search history.

(56) References Cited

U.S. PATENT DOCUMENTS

| 3,769,568 | A |   | 10/1973 | Hamilton et al. |          |
|-----------|---|---|---------|-----------------|----------|
| 4,521,672 | A |   | 6/1985  | Fronius         |          |
| 4,688,158 | A | * | 8/1987  | Peterson et al. | 363/21.18|
| 4,823,070 | A |   | 4/1989  | Nelson          |          |
| 5,134,355 | A |   | 7/1992  | Hastings        |          |
| 5,138,543 | A |   | 8/1992  | Harm et al.     |          |
| 5,305,192 | A | * | 4/1994  | Bonte et al.    | 363/21.16|
| 5,325,282 | A |   | 6/1994  | Bansard         |          |
| 5,438,499 | A |   | 8/1995  | Bonte et al.    |          |
| 5,638,265 | A |   | 6/1997  | Gabor           |          |
| 5,751,561 | A |   | 5/1998  | Ho et al.       |          |
| 5,757,626 | A |   | 5/1998  | Jovanovic et al.|          |
| 5,841,643 | A |   | 11/1998 | Schenkel        |          |
| 5,959,852 | A | * | 9/1999  | Deloy et al.    | 363/45   |
| 5,991,172 | A |   | 11/1999 | Jovanovic et al.|          |
| 6,038,146 | A |   | 3/2000  | Luo et al.      |          |
| 6,043,633 | A |   | 3/2000  | Lev et al.      |          |
| 6,215,288 | B1|   | 4/2001  | Ramsey et al.   |          |
| 6,275,018 | B1|   | 8/2001  | Telefus et al.  |          |
| 6,304,473 | B1|   | 10/2001 | Telefus et al.  |          |
| 6,324,079 | B1|   | 11/2001 | Collmeyer et al.|          |
| 6,370,039 | B1|   | 4/2002  | Telefus         |          |
| 6,381,150 | B2|   | 4/2002  | Telefus         |          |
| 6,385,059 | B1|   | 5/2002  | Telefus et al.  |          |
| 6,396,722 | B2|   | 5/2002  | Lin             |          |

(Continued)

OTHER PUBLICATIONS

Bibian, Stephane et al., "Digital Control with Improved Performance for Boost Power Factor Correction Circuits," 16$^{th}$ Annual IEEE Applied Power Electronics Conference and Exposition, Mar. 2001, vol. 1, pp. 137-143.

(Continued)

*Primary Examiner*—Gary L Laxton
(74) *Attorney, Agent, or Firm*—Fenwick & West LLP (57) ABSTRACT

An AC-to-DC power converter controller reconstructs the output voltage of the power converter without a sample-and-hold circuit or an opto-coupler. The controller includes an accumulation module for accumulating a difference value obtained by subtracting a first representation of an output voltage of the power converter corresponding to a first sampling timing from the output voltage value sampled at a second sampling timing subsequent to the first sampling timing to obtain a second representation of the output voltage of the power converter corresponding to the second sampling timing. The accumulation module may set the second representation of the output voltage to a predetermined maximum value if the output voltage value sampled at the second sampling timing exceeds the predetermined maximum value, or to a predetermined minimum value if the output voltage value sampled at the second sampling timing is less than the predetermined minimum value.

33 Claims, 5 Drawing Sheets

U.S. PATENT DOCUMENTS

| | | |
|---|---|---|
| 6,404,173 B1 | 6/2002 | Telefus |
| 6,434,021 B1 | 8/2002 | Collmeyer et al. |
| 6,621,255 B2 | 9/2003 | Telefus |

OTHER PUBLICATIONS

Erickson, Robert et al., "Design of a Simple High-Power-Factor Rectifier Based on the Flyback Converter," Proceedings of IEEE Applied Power Electronics Conference 1990, Mar. 1990, pp. 792-801.

Murphy, P. et al., "Digital Control of Power Factor Correction," Power Electronics-Annual Seminar, 2003, pp. 341-347.

Zhang, Wanfeng et al., "A New Predictive Control Strategy for Power Factor Correction," 18th Annual IEEE Applied Power Electronics Conference and Exposition, Feb. 2003, vol. 1, pp. 403-409.

"NCP1651—Product Review, Single Stage Power Factor Controller," Apr. 2002, Rev. 1, Semiconductor Components Industries, LLC.

"NCP1651—Single Stage Power Factor Controller" [online], Oct. 2003, Rev. 5, ON Semiconductor Components Industries LLC, [retrieved Jan. 26, 2004]. Retrieved from Internet: <URL: http://www.onsemiconductor.com/pub/Collateral/NCP1651-D.pdf>.

"AND8124/D—90W, Universal Input, Single Stage, PFC Converter" [online], Dec. 2003, ON Semiconductor Components Industries LLC, [retrieved Jan. 26, 2004]. Retrieved from Internet: <URL: http://www.onsemiconductor.com/pub/Collateral/AND8124-D.pdf>.

"Unitrode UC1854, UC2854, UC3854 High Power-Factor Preregulator," Jun. 1998, Texas Instruments Incorporated.

"Linear Technology LT1103/LT1105 Offline Switching Regulator" [online], retrieved on Apr. 12, 2004. Retrieved from Internet: <URL: http://www.linear.com/pdf/11035fd.pdf>.

"Linear Technology LT1725 General Purpose Isolated Flyback Controller" [online], retrieved on Apr. 12, 2004. Retrieved from Internet: <URL: http://www.linear.com/pdf/1725fd.pdf>.

\* cited by examiner

RECONSTRUCTION OF THE OUTPUT VOLTAGE OF AN AC-DC POWER CONVERTER

TECHNICAL FIELD

The present invention relates generally to a power converter, and more specifically, to reconstructing the output voltage of a power converter.

BACKGROUND OF THE INVENTION

Power converters need to detect or reconstruct their output voltage in order to regulate the output voltage to a desired voltage. Power converters need to reconstruct the output voltage and keep it stable for during the switching cycle in order to regulate the output voltage to the desired voltage. Conventional power converters typically reconstruct the output voltage by way of an analog feedback loop using an opto-coupler or a sample-and-hold circuit.

Figure 1:
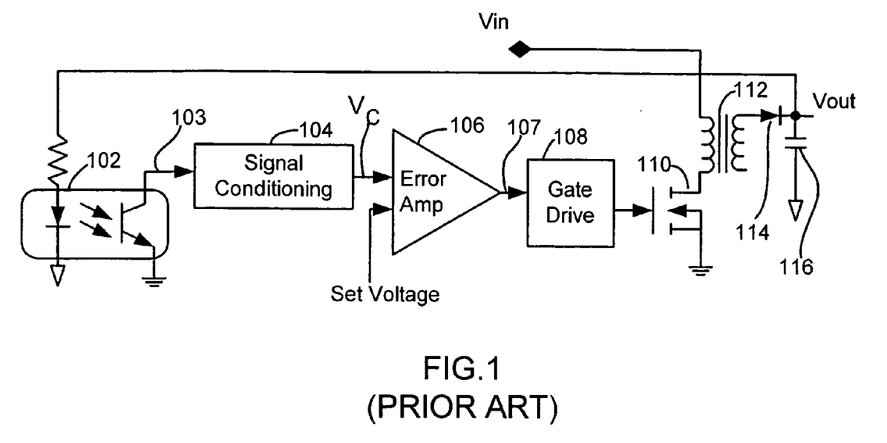
FIG. 1 is a diagram illustrating a conventional power converter that measures the output voltage using an optocoupler.

FIG. 1 is a diagram illustrating a conventional power converter that measures the output voltage using an opto-coupler 102. The power converter senses the output voltage Vout via a diode 114 from the secondary winding of the transformer 112. The sensed output voltage Vout is detected on the primary side of the transformer 112 through an opto-coupler 102 which optically couples the output voltage Vout to the primary side but maintains electrical isolation between the secondary side and the primary side of the transformer 112. The coupled signal 103 is passed through a signal-conditioning module 104. The signal-conditioning module 104 is a combination of a filter with a gain stage to generate a usable scaled voltage signal that represents the value of the sensed output voltage Vout, which is the control voltage Vc. The control voltage Vc is compared to a set voltage in an error amplifier 106, and the amplified error signal 107 is input to the gate drive logic 108. The gate drive logic 108 controls when the switch 110 is turned on or off, by generating turn-on timings ($t_{ON}$) and turn-off timings ($t_{OFF}$) for the switch 110 to regulate the output voltage Vout to the desired voltage.

Figure 2:
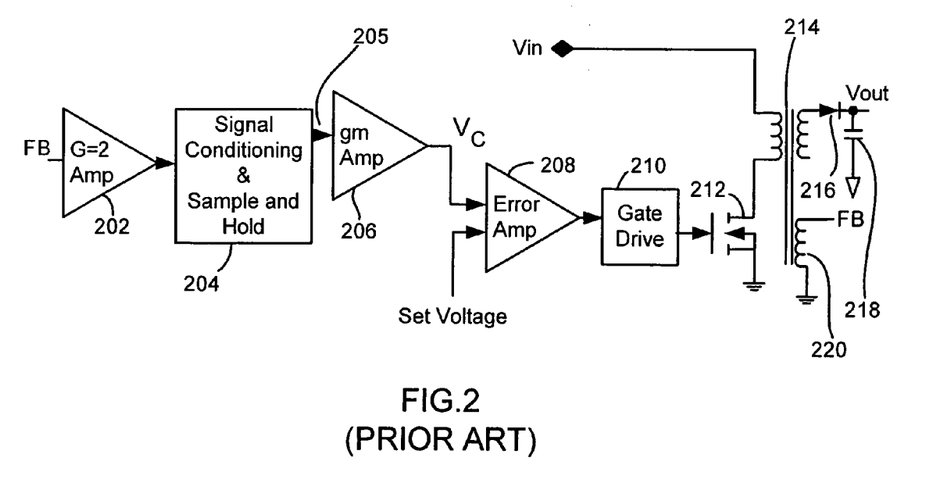
FIG. 2 is a diagram illustrating a conventional power converter that measures the output voltage using a sample-and-hold circuit.

FIG. 2 is a diagram illustrating a conventional power converter that measures the output voltage using a sample and hold circuit 204. The power converter senses the feedback voltage FB, which is a scaled down version of the output voltage Vout at the secondary winding side of the transformer 214, using an auxiliary winding 220. The feedback voltage FB is sampled from the auxiliary winding 220 at a certain sampling timing. However, because the feedback voltage FB does not remain constant after it is sampled, there is a need for a mechanism to retain the value of the feedback voltage FB until the next sampling timing in order to use the feedback voltage FB to regulate the power converter to a desired voltage. Thus, the feedback voltage FB is input to an amplifier 202 and then through a signal conditioning and sample-and-hold circuit 204 to generate a control voltage Vc. The sample-and-hold circuit 204 holds the value of the feedback voltage FB sampled at the sampling timing at the detected value until the next sampling timing. The held signal 205 is amplified by another amplifier 206 to generate the control voltage Vc. The control voltage Vc is compared to a set voltage in an error amplifier 208, and the amplified error signal output from the error amplifier 208 is input to the gate drive logic 210. The gate drive logic 210 controls when the switch 212 is turned on or off, by generating turn-on timings ($t_{ON}$) and turn-off timings ($t_{OFF}$) for the switch 212 to regulate the output voltage Vout to the desired voltage.

However, as shown in FIGS. 1 and 2, conventional power converters use additional components such as opto-couplers or sample-and-hold circuits to measure the output voltage of the power converter while isolating the secondary side of the transformer from the primary side of the transformer in the power converter. Using opto-couplers or sample-and-hold circuits have disadvantages. For example, opto-couplers have an inaccurate transfer ratio resulting in error in the measurement, and they are bandwidth-limited. Sample-and-hold circuits have a disadvantage of capacitive leakage, which means that the error in the sample-and-hold circuit becomes greater as the sampling period becomes longer.

Therefore, there is a need for a power converter that can reconstruct its output voltage without using additional components such as opto-couplers or sample-and-hold circuits.

SUMMARY OF INVENTION

The present invention provides an AC-to-DC power converter, its controller, and a method that can reconstruct the output voltage of the AC-to-DC power converter without a sample-and-hold circuit or an opto-coupler. The AC-to-DC power converter generally includes a switch that electrically couples or decouples a load to or from a power source, and a switch controller coupled to the switch for controlling the on-times and off-times of the switch.

The switch controller includes an accumulation module for accumulating a difference value obtained by subtracting a first representation of an output voltage of the power converter corresponding to a first sampling timing from an output voltage value sampled at a second sampling timing subsequent to the first sampling timing to obtain a second representation of the output voltage of the power converter corresponding to the second sampling timing. A differencer may be provided in the switch controller to obtain the difference value.

In one embodiment, the accumulation module sets the second representation of the output voltage to a predetermined maximum value if the output voltage value sampled at the second sampling timing exceeds the predetermined maximum value. In another embodiment, the accumulation module sets the second representation of the output voltage to a predetermined minimum value if the output voltage value sampled at the second sampling timing is less than the predetermined minimum value.

In another embodiment of the present invention, the controller comprises a comparator and an accumulation module. The comparator includes a negative terminal coupled to a first representation of an output voltage of the power converter corresponding to a first sampling timing and a positive terminal coupled to an output voltage value sampled at a second sampling timing subsequent to the first sampling timing. The comparator compares the values on the positive and negative terminals, and outputs a positive value (typically, +1 or some other positive value) if the output voltage value sampled at the second sampling timing is greater than the first representation of the output voltage of the power converter corresponding to the first sampling timing or a negative value (typically, −1 or some other negative value) if the output voltage value sampled at the second sampling timing is less than the first representation of the output voltage of the power converter corresponding to the first sampling timing. The accumulation module accumulates the positive value or the negative value output from the comparator to obtain a second representation of the output voltage of the power converter corresponding to a second sampling timing.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The embodiments of the present invention will be described below with reference to the accompanying drawings. Like reference numerals are used for like elements in the accompanying drawings.

Figure 3:
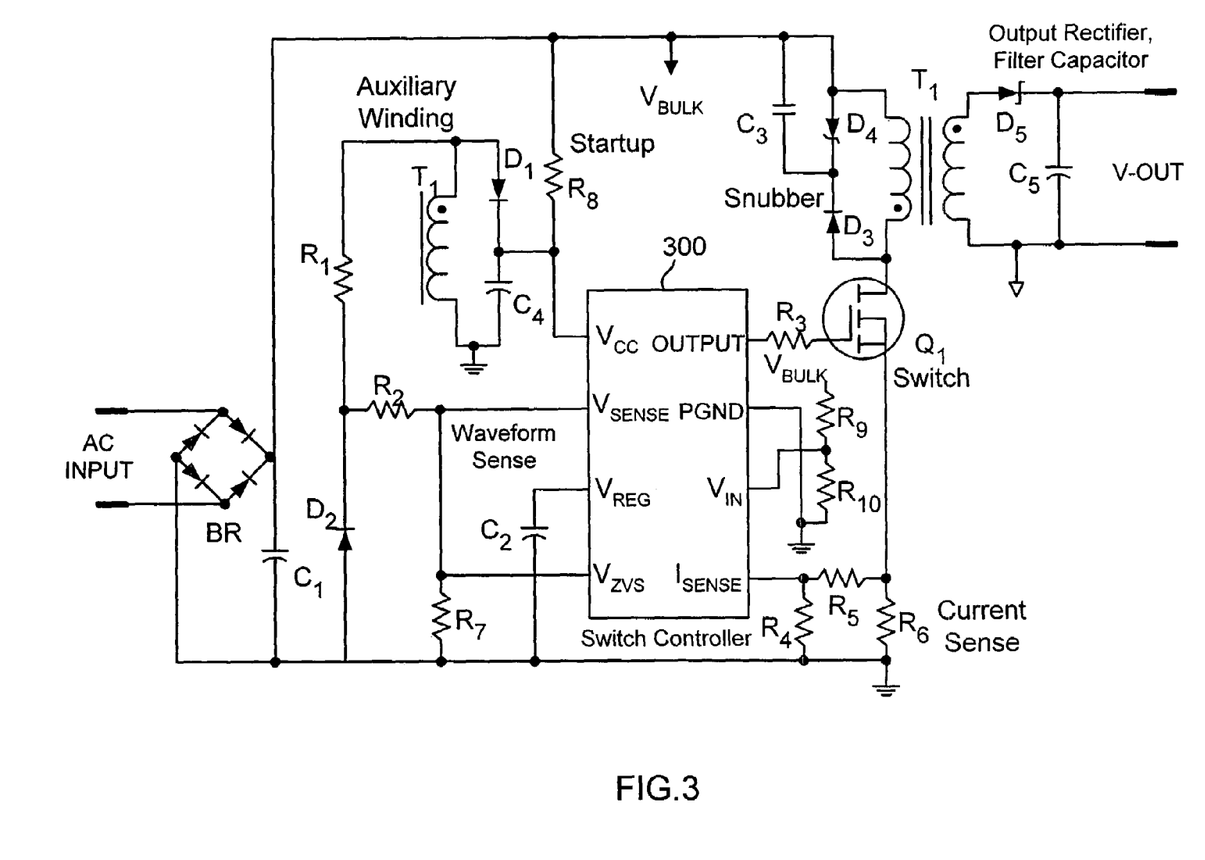
FIG. 3 is a diagram illustrating an AC-DC power converter according to one embodiment of the present invention.

FIG. 3 is a diagram illustrating an AC-DC power converter according to one embodiment of the present invention. The power converter of FIG. 1 is a flyback converter with primary side sensing of the feedback signals. However, it should be noted that the present invention is not limited to a flyback converter and that it can be applied to a power converter of any topology. The power converter includes, among other components, a bridge rectifier BR, a transformer $T_1$, a switch $Q_1$, an output rectifier diode $D_5$, output filter capacitor $C_5$, and a controller 300.

Referring to FIG. 3, the rectifier BR receives an input AC voltage and converts it into a fill-wave rectified voltage for transfer to the output V-OUT. The controller 300 controls the opening and closing of the switch $Q_1$ using its output control signal OUTPUT. When the switch $Q_1$ is turned on, energy is stored in the primary side windings of the transformer $T_1$ because the diode $D_5$ is reverse biased. When the switch $Q_1$ is turned off, the energy stored in the primary windings of the transformer $T_1$ is released to the secondary side of the transformer $T_1$ because the diode $D_5$ becomes forward biased. By controlling the period of time during which the switch $Q_1$ is on or off, the power converter can control the amount of power delivered to the output.

The controller 300 receives various input parameters for use in controlling the switch $Q_1$. The controller 300 receives a Vcc (supply voltage) via the startup resistor $R_8$, a divided-down version ($V_{SENSE}$) of the reflected secondary voltage on the auxiliary windings of the transformer $T_1$, a reference voltage $V_{REG}$ of the controller 300, a zero voltage switching voltage Vzvs, an input voltage $V_{IN}$ which is a scaled version of $V_{BULK}$, the primary current sense voltage $I_{SENSE}$ sensing the current flowing through switch $Q_1$ in terms of a voltage across the network of resistors $R_4$, $R_5$, and $R_6$, and Power Ground (PGND), and generates a control signal OUTPUT coupled to the switch $Q_1$ for controlling the on-times and off-times of the switch $Q_1$. The diode $D_5$ rectifies the output voltage on the secondary windings of the transformer $T_1$ and the capacitor $C_5$ filters the output voltage signal on the secondary windings of the transformer $T_1$ for outputting as V-OUT.

Figure 4:
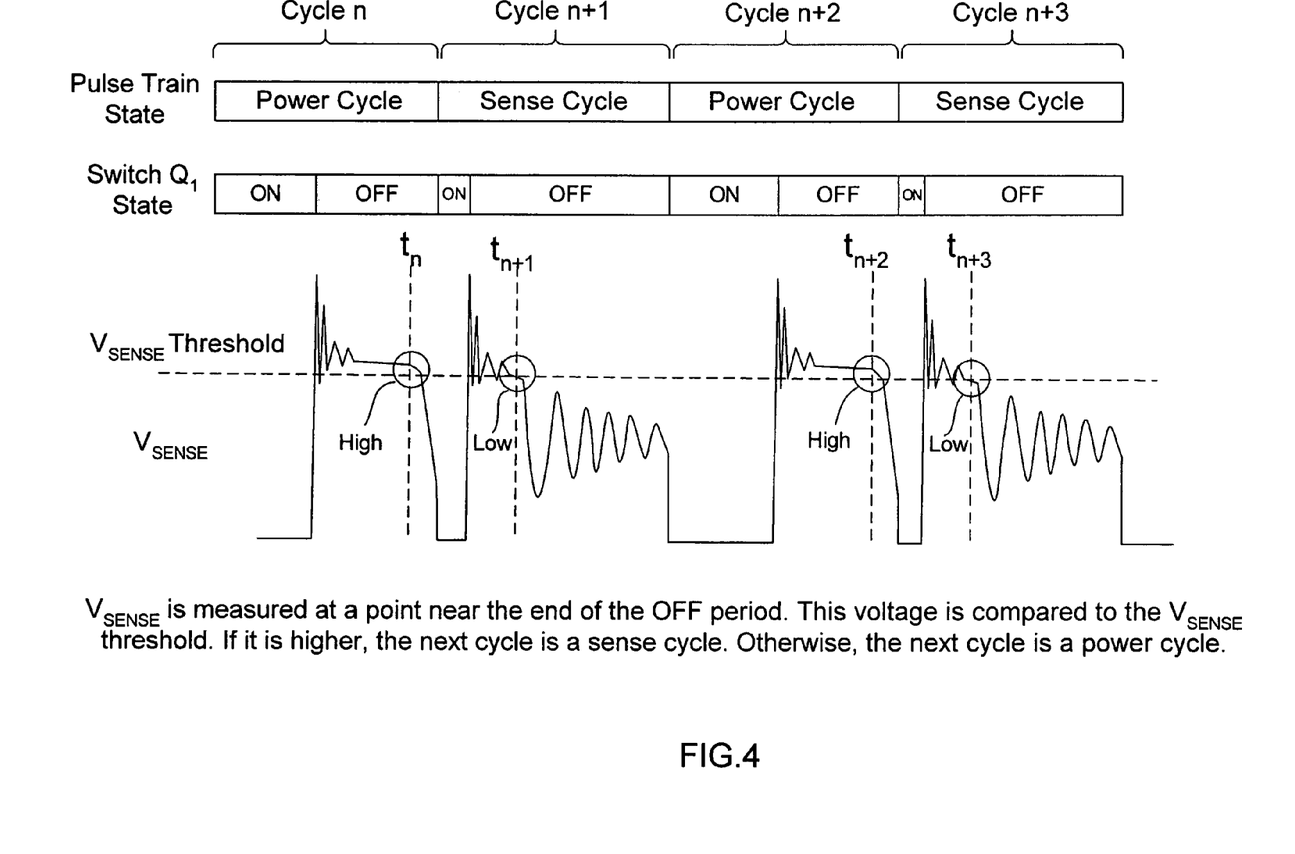
FIG. 4 is a diagram illustrating the cycles in which the switch in the power converter is controlled by the switch controller and the waveforms of the signal VSENSE during such switching cycles, according to one embodiment of the present invention.

FIG. 4 is a diagram illustrating the cycles in which the switch $Q_1$ in the power converter is controlled by the controller 300 and the waveforms of the signal $V_{SENSE}$ during such switching cycles, according to one embodiment of the present invention. Referring to FIG. 4, the switch $Q_1$ is sometimes turned on primarily for the purpose of delivering energy to the load (power cycle), although primary side sensing is still carried out during the power cycle. During the power cycle, the power converter is typically operated in critical discontinuous conduction mode to deliver as much power to the load as possible. At other times, the switch $Q_1$ is turned on primarily for the purpose of primary-side sensing of the output voltage (sense cycle), although some power is still delivered to the load during the sense cycle. During the sense cycle, the power converter is typically operated in discontinuous conduction mode to deliver less power to the load. In one embodiment, the controller 300 generates control signals OUT to control the switch $Q_1$ according to the power cycles and sense cycles depicted in FIG. 4.

As shown in FIG. 4, $V_{SENSE}$ is sampled at points ($t_n$, $t_{n+1}$, $t_{n+2}$, $t_{n+3}$) near the end of the OFF period of each power cycle or sense cycle and is compared to the threshold voltage $V_{SENSE-THRESHOLD}$. If the sampled value of $V_{SENSE}$ is larger than $V_{SENSE-THRESHOLD}$, the next cycle is controlled by the controller 300 to be a sense cycle. If the sampled value of $V_{SENSE}$ is smaller than $V_{SENSE-THRESHOLD}$, the next cycle is controlled by the controller 300 to be a power cycle.

As can be seen from FIG. 4, the value of $V_{SENSE}$, which is a scaled down value of the output voltage V-OUT, changes over timing during each cycle (n, n+1, n+2, and n+3). Thus, the power converter samples the values of $V_{SENSE}$ at the sampling timings ($t_n$, $t_{n+1}$, $t_{n+2}$, $t_{n+3}$) to obtain a representation of the output voltage V-OUT of the power converter at such sampling timings. However, the power converter needs to have a stable value of $V_{SENSE}$ during the entire cycle (n, n+1, n+2, and n+3) in order to regulate the output voltage V-OUT. Therefore, the controller 300 of the present invention uses an accumulator to obtain a stable value of the $V_{SENSE}$ during the each of the switching cycles, as will be explained in more detail with reference to FIG. 5.

Figure 5:
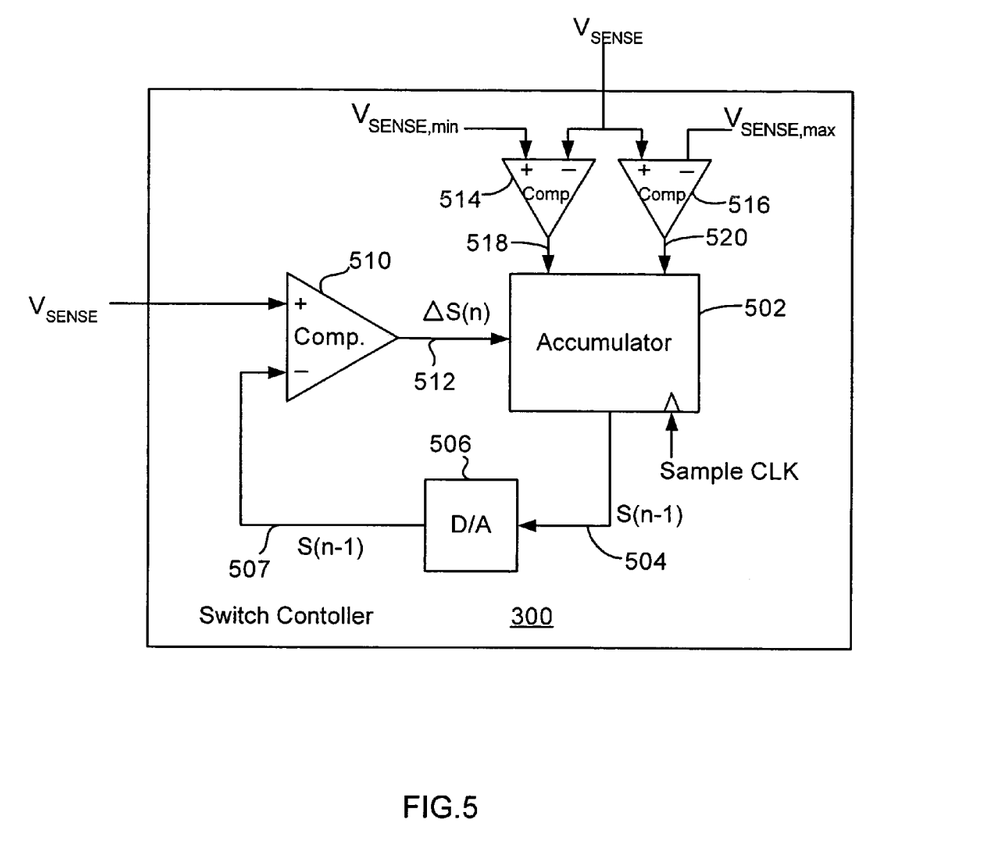
FIG. 5 is a block diagram illustrating the switch controller according to one embodiment of the present invention.

FIG. 5 is a block diagram illustrating the switch controller 300 according to one embodiment of the present invention. The controller 300 includes, among other components, an accumulator 502, comparators 510, 514, 516, and a digital-to-analog (D/A) converter 506. As will be clear to one of ordinary skill in the art, there are other components in the switch controller 300, for example, to generate the on-timings ($t_{ON}$) and the off-timings ($t_{OFF}$) for the switch $Q_1$, however they are not directly related to the subject matter of the present invention and are omitted from FIG. 5. In addition, other input/output signals to or from the switch controller 300 are also omitted from FIG. 5 to the extent that they are not directly related to the subject matter of the present invention.

The accumulator 502 accumulates the differences between $V_{SENSE}$ sampled at the current sampling timing and the representation of $V_{SENSE}$ corresponding to the previous sampling timings to obtain the current representation of $V_{SENSE}$ at the current sampling timing. Thus, the accumulator 502 executes the following accumulation function:

$$S(n)=S(n-1)+\Delta S(n),$$

where S(n) is the sum corresponding to the current sampling timing (cycle) representative of the value of $V_{SENSE}$ at the current sampling timing ($t_n$), S(n−1) is the sum corresponding to the preceding sampling timing (cycle) representative of the value of $V_{SENSE}$ at the preceding sampling timing ($t_{n-1}$), and $\Delta S(n)$ is the difference between $V_{SENSE}$ and S(n−1), i.e., $\Delta S(n)=V_{SENSE}-S(n-1)$. Thus, $S(n)=S(n-1)+\Delta S(n)=S(n-1)+V_{SENSE}-S(n-1)=V_{SENSE}$. Thus, the accumulator 502 provides S(n), i.e., a digital representation of $V_{SENSE}$ at the current sampling timing ($t_n$) without any sample-and-hold circuitry. Since S(n) is obtained as a digital value, it is also compatible with the remaining components (not shown) of the switch controller 300 that digitally generate the on-timings ($t_{ON}$) and off-timings ($t_{OFF}$) for the switch $Q_1$ to regulate the output voltage V-OUT of the power converter. The accumulator 502 is clocked by the sampling timing signals ($t_n$). The preceding sampling timing ($t_{n-1}$) may immediately precede the current sampling timing ($t_n$) or precede the current sampling timing ($t_n$) by two or more cycles.

The D/A converter 506 receives S(n−1) corresponding to the preceding sampling timing ($t_{n-1}$) as a digital value 504 and converts it to an analog value 507 corresponding to S(n−1). The analog value 507 of S(n−1) is compared to $V_{SENSE}$ in the comparator 510.

In one embodiment, the comparator 510 is a digital differencer that compares the magnitudes of the values of $V_{SENSE}$ to S(n−1) and outputs a digital value 512 representative of the difference between the two values, i.e., $\Delta S(n) = V_{SENSE}-S(n-1)$. In another embodiment, the comparator 510 is a binary comparator that merely generates +1 (or some other positive value) if $V_{SENSE}$ is larger than S(n−1) or −1 (or some other negative value) if $V_{SENSE}$ is less than S(n−1) as its output 512.

The sampling period $\Delta t$ is the difference in time between two successive sampling timings, i.e., $\Delta t = t_n - t_{n-1}$. In one embodiment, the sampling timings are regularly spaced such that the sampling period $\Delta t$ is uniform for every switching cycle (n, n+1, n+2 ... ). However, in other embodiments, the sampling timings need not be regularly spaced and $\Delta t$ does not have to be uniform for every switching cycle.

In one embodiment, the sampling period $\Delta t$ is set such that the sampling frequency (1/$\Delta t$) exceeds at least twice the frequency of $V_{SENSE}$ (to satisfy the Nyquist sampling theorem and generally avoid aliasing), regardless of whether the sampling period $\Delta t$ is the uniform for every switching cycle. However, even with such sampling frequency (1/$\Delta t$) exceeding twice the frequency of $V_{SENSE}$, it is still possible for aliasing to occur for periodic signals whose frequency is approximately the same as the sampling frequency (1/$\Delta t$).

Therefore, in another embodiment, the sampling frequency (1/$\Delta t$) is set such that the sampling frequency (1/$\Delta t$) is much higher than the frequency of $V_{SENSE}$ in order to avoid under-sampling. For example, the sampling frequency (1/$\Delta t$) is set at least 10 times higher than the frequency of $V_{SENSE}$. If the sampling period $\Delta t$ is not uniform, then the sampling frequency (1/$\Delta t$) is set such that the minimum of the sampling frequencies (1/$\Delta t$) is much higher than the frequency of $V_{SENSE}$ in order to avoid under-sampling. For example, the minimum of the sampling frequency (1/$\Delta t$) is set at least 10 times higher than the frequency of $V_{SENSE}$.

In another embodiment, the switch controller 300 is also capable of detecting excessively high or low values of $V_{SENSE}$ that are out of range of the switch controller 300. Thus, the comparator 516 compares the value of $V_{SENSE}$ at the sampling timing ($t_n$) to a predetermined maximum value for $V_{SENSE}$ ($V_{SENSE,max}$) and generates a FlagMax signal 520 of "1" when the value of $V_{SENSE}$ at the sampling timing ($t_n$) exceeds the predetermined maximum value for $V_{SENSE}$ ($V_{SENSE,max}$). Otherwise, the comparator 516 generates a FlagMax signal 520 of "0." The comparator 514 compares the value of $V_{SENSE}$ at the sampling timing ($t_n$) to a predetermined minimum value for $V_{SENSE}$ ($V_{SENSE,min}$) and generates a FlagMin signal 518 of "1" when the value of $V_{SENSE}$ at the sampling timing ($t_n$) is less than the predetermined minimum value for $V_{SENSE}$ ($V_{SENSE,min}$). Otherwise, the comparator 514 generates a FlagMin signal 518 of "0." The accumulator 502 includes logic (not shown) that sets S(n) for the sampling timing ($t_n$) to $V_{SENSE,max}$ when FlagMax 520 is "1" or to $V_{SENSE,min}$ when FlagMin 518 is "1."

Figure 6:
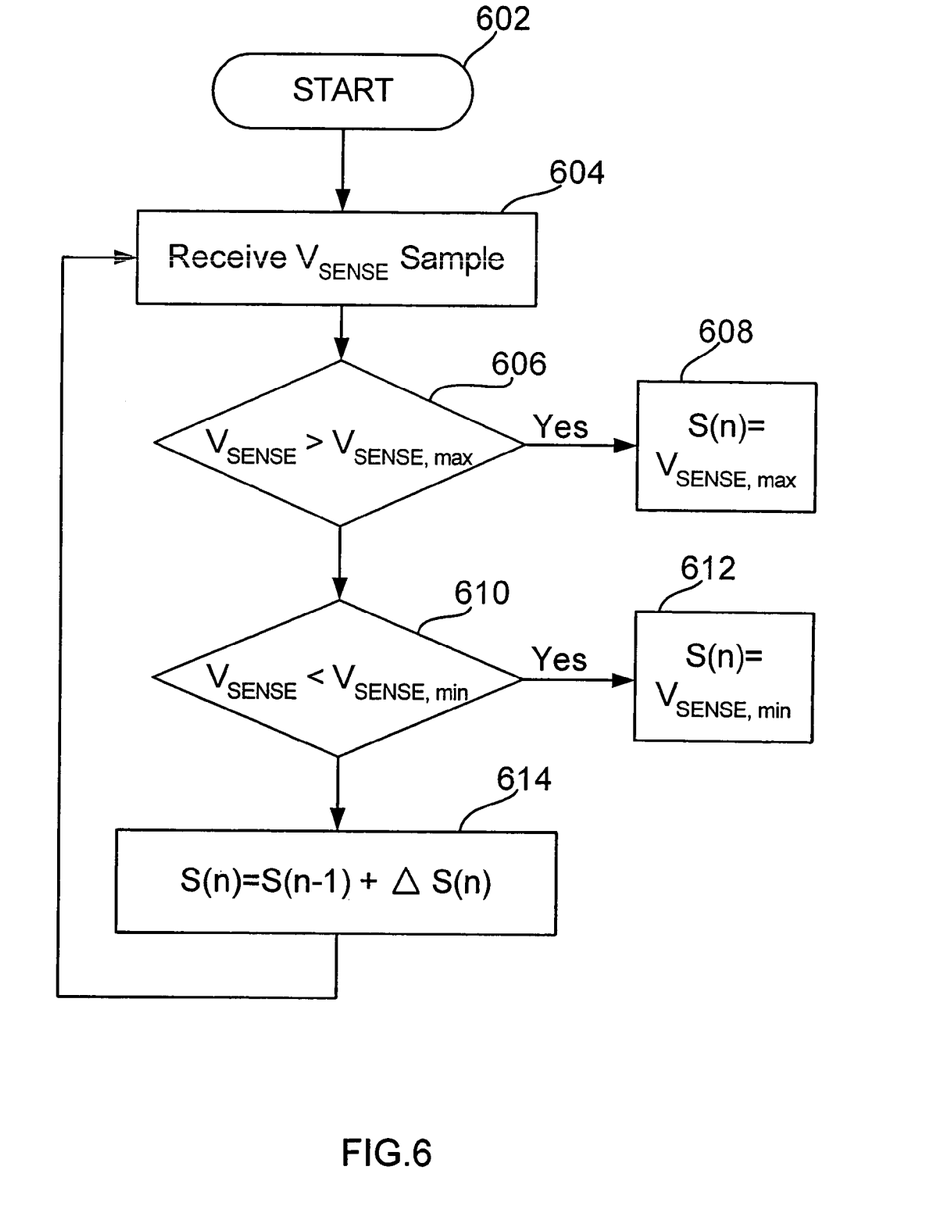
FIG. 6 is a flowchart illustrating a method of reconstructing the output voltage of the power converter, according to one embodiment of the present invention.

FIG. 6 is a flowchart illustrating a method of reconstructing the output voltage of the power converter, according to one embodiment of the present invention. In one embodiment, the process described in FIG. 6 occurs in the switch controller 300. In another embodiment, the process described in FIG. 6 may occur in a state machine forming at least part of the switch controller 300.

As the process starts 602, the switch controller 300 receives 604 the $V_{SENSE}$ sample sampled at the current sampling timing ($t_n$). Then, the switch controller 300 determines 606 whether the sampled $V_{SENSE}$ value exceeds a predetermined maximum value, $V_{SENSE}$, max. If the sampled $V_{SENSE}$ value exceeds the predetermined maximum value, $V_{SENSE}$, max, the switch controller sets 608 S(n) to be equal to $V_{SENSE}$, max. Then, the switch controller 300 determines 610 whether the sampled $V_{SENSE}$ value is less than a predetermined minimum value, $V_{SENSE, min}$. If the sampled $V_{SENSE}$ value is less than the predetermined minimum value, $V_{SENSE, min}$, then the switch controller sets 612 S(n) to be equal to $V_{SENSE,min}$.

Finally, the switch controller accumulates 614 the differences between the $V_{SENSE}$ value sampled at the current sampling timing and the value representative of $V_{SENSE}$ corresponding to the preceding sampling timing, by performing $S(n)=S(n-1)+\Delta S(n)$, where S(n) is the sum corresponding to the current sampling timing (cycle) representative of the value of $V_{SENSE}$ at the current sampling timing ($t_n$), S(n−1) is the sum corresponding to the preceding sampling timing (cycle) representative of the value of $V_{SENSE}$ at the preceding sampling timing ($t_{n-1}$), and $\Delta S(n)$ is the difference between the sampled $V_{SENSE}$ value and S(n−1), i.e., $\Delta S(n)=V_{SENSE}-S(n-1)$. Then, the process returns 604 to receive the sampled $V_{SENSE}$ value corresponding to the next sampling timing.

Although the present invention has been described above with respect to several embodiments, various modifications can be made within the scope of the present invention. For example, the present invention is not limited to any topology of AC-to-DC power converter, and can be used with flyback type AC-to-DC power converters, boost type AC-to-DC power converters, and the like. The accumulator 502 described herein may be implemented by digital logic circuits, state machines, or other types of circuitry to the extent that it can perform the accumulation functions as described herein. Accordingly, the disclosure of the present invention is intended to be illustrative, but not limiting, of the scope of the invention, which is set forth in the following claims.

What is claimed is:

1. An AC-to-DC power converter comprising:
   a switch that electrically couples or decouples a load to or from a power source; and
   a controller coupled to the switch for controlling on-times and off-times of the switch, the controller including an accumulation module for accumulating a difference value obtained by subtracting a first representation of an output voltage of the power converter corresponding to a first sampling timing from an output voltage value sampled at a second sampling timing subsequent to the first sampling timing to obtain a second representation of the output voltage of the power converter corresponding to the second sampling timing.

2. The AC-to-DC power converter of claim 1, wherein the accumulation module sets the second representation of the output voltage to a predetermined maximum value if the output voltage value sampled at the second sampling timing exceeds the predetermined maximum value.

3. The AC-to-DC power converter of claim 2, wherein the controller further comprises a comparator coupled to the accumulation module for comparing the output voltage value sampled at the second sampling timing to the predetermined maximum value.

4. The AC-to-DC power converter of claim 1, wherein the accumulation module sets the second representation of the output voltage to a predetermined minimum value if the output voltage value sampled at the second sampling timing is less than the predetermined minimum value.

5. The AC-to-DC power converter of claim 4, wherein the controller further comprises a comparator coupled to the accumulation module for comparing the output voltage value sampled at the second sampling timing to the predetermined minimum value.

6. An AC-to-DC power converter comprising:
   a switch that electrically couples or decouples a load to or from a power source; and
   a controller coupled to the switch for controlling on-times and off-times of the switch, the controller including:
      a differencer for subtracting a first representation of an output voltage of the power converter corresponding to a first sampling timing from an output voltage value sampled at a second sampling timing subsequent to the first sampling timing to obtain a difference value; and
      an accumulation module coupled to the differencer for accumulating the difference value to obtain a second representation of the output voltage of the power converter corresponding to the second sampling timing.

7. The AC-to-DC power converter of claim 6, wherein the controller further comprises a comparator coupled to the accumulation module for comparing the output voltage value sampled at the second sampling timing to a predetermined maximum value, the accumulation module setting the second representation of the output voltage to the predetermined maximum value if the output voltage value sampled at the second sampling timing exceeds the predetermined maximum value.

8. The AC-to-DC power converter of claim 6, wherein the controller further comprises a comparator coupled to the accumulation module for comparing the output voltage value sampled at the second sampling timing to a predetermined minimum value, the accumulation module setting the second representation of the output voltage to the predetermined minimum value if the output voltage value sampled at the second sampling timing is less than the predetermined minimum value.

9. The AC-to-DC power converter of claim 6, wherein the controller further comprises a digital-to-analog converter coupled to the accumulation module and the differencer, the digital-to-analog converter receiving a digital value corresponding to the first representation of the output voltage and converting the digital value to an analog value for comparison in the differencer with the output voltage value sampled at the second sampling timing.

10. An AC-to-DC power converter comprising:
    a switch that electrically couples or decouples a load to or from a power source; and
    a controller coupled to the switch for controlling on-times and off-times of the switch, the controller including:
       a first comparator having a negative terminal coupled to a first representation of an output voltage of the power converter corresponding to a first sampling timing and a positive terminal coupled to an output voltage value sampled at a second sampling timing subsequent to the first sampling timing and outputting a positive value or a negative value; and
       an accumulation module coupled to the first comparator for accumulating the positive value or the negative value to obtain a second representation of the output voltage of the power converter corresponding to the second sampling timing.

11. The AC-to-DC power converter of claim 10, wherein the controller further comprises a second comparator coupled to the accumulation module for comparing the output voltage value sampled at the second sampling timing to a predetermined maximum value, the accumulation module setting the second representation of the output voltage to the predetermined maximum value if the output voltage value sampled at the second sampling timing exceeds the predetermined maximum value.

12. The AC-to-DC power converter of claim 10, wherein the controller further comprises a second comparator coupled to the accumulation module for comparing the output voltage value sampled at the second sampling timing to a predetermined minimum value, the accumulation module setting the second representation of the output voltage to the predetermined minimum value if the output voltage value sampled at the second sampling timing is less than the predetermined minimum value.

13. The AC-to-DC power converter of claim 10, wherein the controller further comprises a digital-to-analog converter coupled to the accumulation module and the first comparator, the digital-to-analog converter receiving a digital value corresponding to the first representation of the output voltage and converting the digital value to an analog value for comparison in the first comparator with the output voltage value sampled at the second sampling timing.

14. An AC-to-DC power converter comprising:
    a switch that electrically couples or decouples a load to or from a power source; and
    a controller coupled to the switch for controlling on-times and off-times of the switch, the controller including an accumulation module for performing the following accumulation:

$$S(n) = S(n-1) + \Delta S(n),$$

where $\Delta S(n)$ is a difference value obtained by subtracting a first representation $S(n-1)$ of an output voltage of the power converter corresponding to a first sampling timing $t_{n-1}$, from an output voltage value sampled at a second sampling timing $t_n$ subsequent to the first sampling timing $t_{n-1}$, S(n−1) is the first representation of the output voltage corresponding to the first sampling timing $t_{n-1}$, and S(n) is a second representation of the output voltage corresponding to the second sampling timing $t_n$.

15. A controller for controlling on-times and off-times of a switch that electrically couples or decouples a load to or from a power source in an AC-to-DC power converter, the controller comprising an accumulation module for accumulating a difference value obtained by subtracting a first representation of an output voltage of the power converter corresponding to a first sampling timing from an output voltage value sampled at a second sampling timing subsequent to the first sampling timing to obtain a second representation of the output voltage of the power converter corresponding to the second sampling timing.

16. The controller of claim 15, wherein the accumulation module sets the second representation of the output voltage to a predetermined maximum value if the output voltage value sampled at the second sampling timing exceeds the predetermined maximum value.

17. The controller of claim 16, further comprising a comparator coupled to the accumulation module for comparing the output voltage value sampled at the second sampling timing to the predetermined maximum value.

18. The controller of claim 15, wherein the accumulation module sets the second representation of the output voltage to a predetermined minimum value if the output voltage value sampled at the second sampling timing is less than the predetermined minimum value.

19. The controller of claim 15, further comprising a comparator coupled to the accumulation module for comparing the output voltage value sampled at the second sampling timing to the predetermined minimum value.

20. A controller for controlling on-times and off-times of a switch that electrically couples or decouples a load to or from a power source in an AC-to-DC power converter, the controller comprising:
a differencer for subtracting a first representation of an output voltage of the power converter corresponding to a first sampling timing from an output voltage value sampled at a second sampling timing subsequent to the first sampling timing to obtain a difference value; and
an accumulation module coupled to the differencer for accumulating the difference value to obtain a second representation of the output voltage of the power converter corresponding to the second sampling timing.

21. The controller of claim 20, further comprising a comparator coupled to the accumulation module for comparing the output voltage value sampled at the second sampling timing to a predetermined maximum value, the accumulation module setting the second representation of the output voltage to the predetermined maximum value if the output voltage value sampled at the second sampling timing exceeds the predetermined maximum value.

22. The controller of claim 20, further comprising a comparator coupled to the accumulation module for comparing the output voltage value sampled at the second sampling timing to a predetermined minimum value, the accumulation module setting the second representation of the output voltage to the predetermined minimum value if the output voltage value sampled at the second sampling timing is less than the predetermined minimum value.

23. The controller of claim 20, further comprising a digital-to-analog converter coupled to the accumulation module and the differencer, the digital-to-analog converter receiving a digital value corresponding to the first representation of the output voltage and converting the digital value to an analog value for comparison in the differencer with the output voltage value sampled at the second sampling timing.

24. A controller for controlling on-times and off-times of a switch that electrically couples or decouples a load to or from a power source in an AC-to-DC power converter, the controller comprising:
a first comparator having a negative terminal coupled to a first representation of an output voltage of the power converter corresponding to a first sampling timing and a positive terminal coupled to an output voltage value sampled at a second sampling timing subsequent to the first sampling timing and outputting a positive value or a negative value; and
an accumulation module coupled to the first comparator for accumulating the positive value or the negative value to obtain a second representation of the output voltage of the power converter corresponding to the second sampling timing.

25. The controller of claim 24, further comprising a second comparator for comparing the output voltage value sampled at the second sampling timing to a predetermined maximum value, the accumulation module setting the second representation of the output voltage to the predetermined maximum value if the output voltage value sampled at the second sampling timing exceeds the predetermined maximum value.

26. The controller of claim 24, further comprising a second comparator for comparing the output voltage value sampled at the second sampling timing to a predetermined minimum value, the accumulation module setting the second representation of the output voltage to the predetermined minimum value if the output voltage value sampled at the second sampling timing is less than the predetermined minimum value.

27. The controller of claim 24, further comprising a digital-to-analog converter coupled to the accumulation module and the first comparator, the digital-to-analog converter receiving a digital value corresponding to the first representation of the output voltage and converting the digital value to an analog value for comparison in the first comparator with the output voltage value sampled at the second sampling timing.

28. A controller for controlling on-times and off-times of a switch that electrically couples or decouples a load to or from a power source in an AC-to-DC power converter, the controller comprising an accumulation module for performing the following accumulation:

$$S(n)=S(n-1)+\Delta S(n),$$

where $\Delta S(n)$ is a difference value obtained by subtracting a first representation S(n−1) of an output voltage of the power converter corresponding to a first sampling timing $t_{n-1}$ from an output voltage value sampled at a second sampling timing $t_n$ subsequent to the first sampling timing $t_{n-1}$, S(n−1) is the first representation of the output voltage corresponding to the first sampling timing $t_{n-1}$, and S(n) is a second representation of the output voltage corresponding to the second sampling timing $t_n$.

29. A method for obtaining a representation of an output voltage of an AC-to-DC power converter, the method comprising:
receiving an output voltage value sampled at a second sampling timing subsequent to a first sampling timing;

obtaining a difference value by subtracting a first representation of an output voltage of the power converter corresponding to the first sampling timing from the output voltage value sampled at the second sampling timing; and accumulating the difference value to obtain a second representation of the output voltage of the power converter corresponding to the second sampling timing.

30. The method of claim 29, further comprising setting the second representation of the output voltage to a predetermined maximum value if the output voltage value sampled at the second sampling timing exceeds the predetermined maximum value.

31. The method of claim 29, further comprising setting the second representation of the output voltage to a predetermined minimum value if the output voltage value sampled at the second sampling timing is less than the predetermined minimum value.

32. A method for obtaining a representation of an output voltage of an AC-to-DC power converter, the method comprising:

receiving an output voltage value sampled at a second sampling timing $t_n$ subsequent to a first sampling timing $t_{n-1}$;

obtaining a difference value $\Delta S(n)$ by subtracting a first representation $S(n-1)$ of an output voltage of the power converter corresponding to the first sampling timing $t_{n-1}$ from the output voltage value sampled at the second sampling timing; and accumulating the difference value $\Delta S(n)$ by performing the following accumulation:

$$S(n)=S(n-1)+\Delta S(n),$$

to obtain a second representation $S(n)$ of the output voltage of the power converter corresponding to the second sampling timing $t_n$.

33. A controller for controlling on-times and off-times of a switch that electrically couples or decouples a load to or from a power source in an AC-to-DC power converter, the controller comprising:

means for subtracting a first representation of an output voltage of the power converter corresponding to a first sampling timing from an output voltage value sampled at a second sampling timing subsequent to the first sampling timing to obtain a difference value; and means for accumulating the difference value to obtain a second representation of the output voltage of the power converter corresponding to the second sampling timing.

* * * * *